July 14, 1959  R. T. GLASS  2,894,652
CONTINUOUSLY MOVING APPARATUS FOR WITHDRAWING
FROZEN CONFECTION FROM MOLDS
Original Filed Dec. 14, 1953  2 Sheets-Sheet 1

INVENTOR
Robert Taylor Glass
BY Beale and Jones
ATTORNEYS

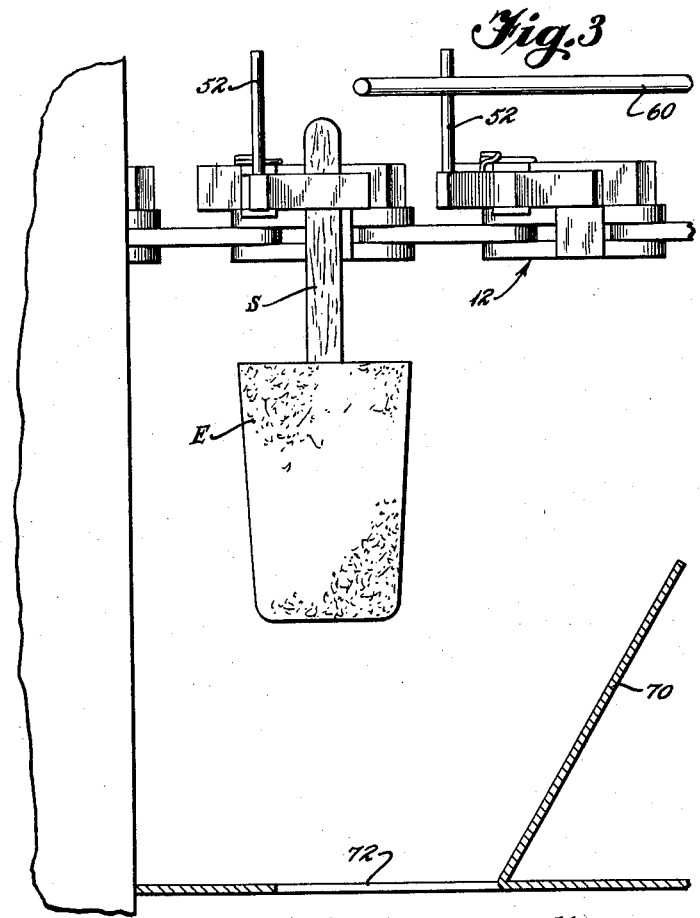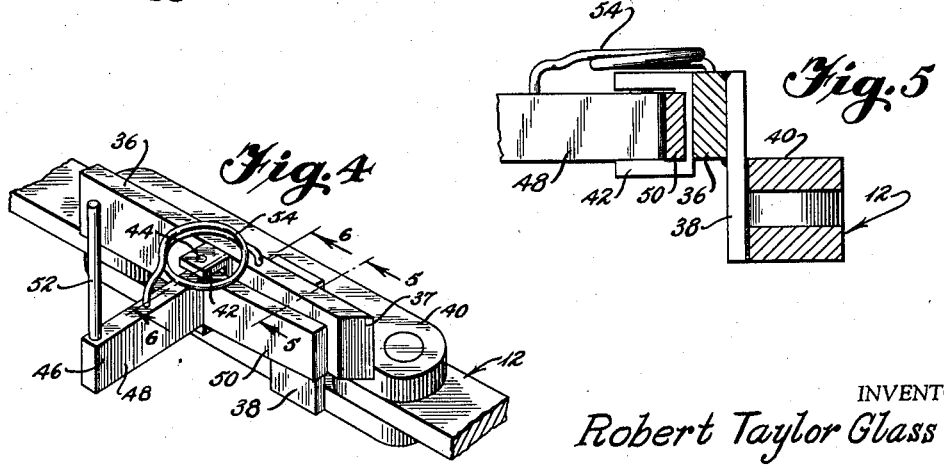

United States Patent Office 2,894,652
Patented July 14, 1959

2,894,652

CONTINUOUSLY MOVING APPARATUS FOR WITHDRAWING FROZEN CONFECTION FROM MOLDS

Robert Taylor Glass, Austin, Tex.

Original application December 14, 1953, Serial No. 398,100. Divided and this application July 3, 1957, Serial No. 669,728

5 Claims. (Cl. 214—300)

This invention relates to an automatic apparatus for withdrawing frozen confections from molds. It is adapted for use with a confection making machine as claimed in application Serial No. 398,100, filed December 14, 1953, of which this case is a division. More particularly, it relates to a withdrawing apparatus including a first conveyor which has attached thereto a plurality of frozen confection molds, said molds adapted to be filled with a confection having a stick extending upwardly from the center thereof, and a second conveyor carrying with it at regularly spaced intervals a plurality of spring-biased clamps, said clamps being operated by a cam bar disposed adjacent said second conveyor and each one adapted to close on one of the sticks in said molds. Beyond this point of closing the two conveyors diverge so that a pulling force is exerted to remove the frozen confection from its mold.

Frozen confections of the "Good Humor" type have become extremely popular. It is, therefore, highly desirable that their production may be as rapid as possible and that they may be continuously made with little or no supervision of the machines which make them.

Several patents in the prior art have been directed to machines for making such frozen confections. One of these patents is No. 1,960,456 to Robb. This patent discloses a machine for making frozen confections in which molds containing edible substance are carried by one conveyor through a frozen zone. A stick is inserted in each of the molds and the freezing continues until the substance congeals about the stick. A second conveyor is provided, and has attached to it a plurality of clamping means moving in timed relation to the molds on the first conveyor. Both conveyors are driven in step-by-step intermittent motion. At the end of its freezing each confection reaches a transfer station at which time the entire conveyor system stops momentarily and one of the clamping means on the second conveyor engages the stick in said confection. A cam wheel then raises said clamping means away from the first conveyor to remove the confection from its mold. The motion of the two conveyors then resumes.

One of the disadvantages of the above-described apparatus is the fact that its motion is intermittent, the motion of both conveyors ceasing during the time of transfer and withdrawal.

According to the present invention, the motion of both conveyors is continuous. The withdrawal of the confection from the mold is effected by the gradual increase in distance apart of the stick clamping means and the molds due to the continuous motion of the separate conveyors in diverging directions.

Another object of this invention is to provide a frozen confection with withdrawing means which is simple and automatic so as to require virtually no supervision.

Another object of this invention is to provide a machine for making frozen confections in which the withdrawing device is extremely inexpensive to make.

This invention embodies other novel features, details of conception and arrangement of parts which are hereinafter set forth in the specification and claims, and illustrated in the accompanying drawings wherein:

Fig. 3 is an enlarged elevational view of the area of the apparatus in which the frozen confection is released;

Fig. 4 is an enlarged perspective view taken slightly from above of one of the spring-biased clamps;

Fig. 5 is an enlarged sectional view showing a cross-section of one of the spring-biased clamps taken on the line 5—5 of Fig. 4;

Figure 1:
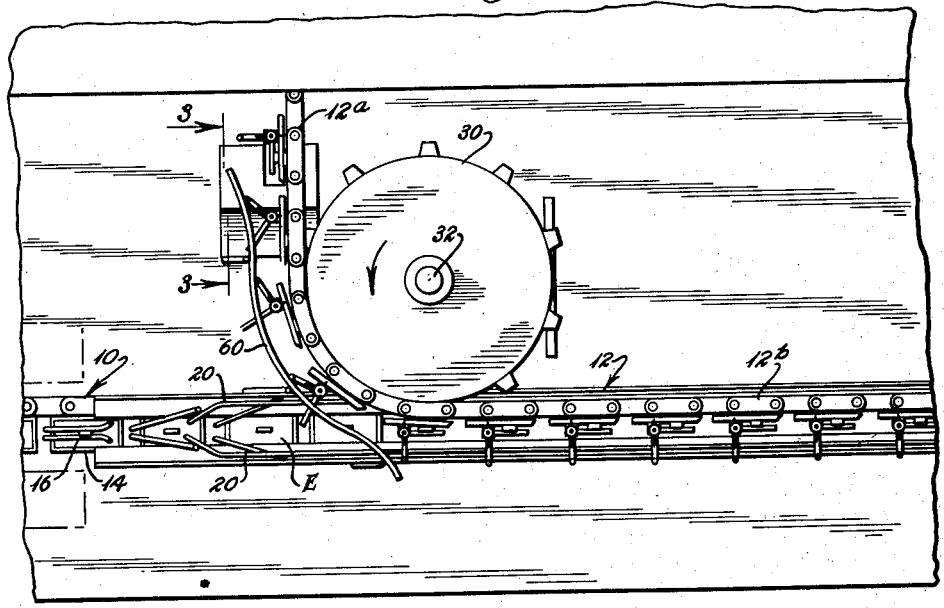
Fig. 1 is a plan view of the withdrawing apparatus in use.

Referring more specifically to the drawings, the confection making apparatus comprises a pair of conveyors 10 and 12. The conveyor 10 is preferably a chain type conveyor and has attached thereto at regularly spaced intervals a plurality of mold receptables 14 adapted to receive an edible substance E. Each of the mold receptacles 14 has pivoted thereto near its open end a pair of elongated members or wires 16 each having a horizontal portion adapted to engage a stick S which has been inserted into the receptacles. The wires 16 terminate in upwardly extending ends 18. Wires 16 support the sticks S while the edible substance E is semi-liquid. After freezing, wires 16 are no longer necessary to support sticks S. Therefore, they are spread apart by means of cam members 20 fixedly positioned along the conveyor 12 and adapted to engage the ends 18. The means for supporting the cam 20 is not shown to avoid overcomplication of the drawings. With wires 16 spread apart, it is possible for the frozen edible substance E to be removed from its mold.

The conveyor 12 is also preferably of the chain conveyor type and is trained over the sprocket 30 which freely rotates on shaft 32. A second sprocket is positioned in the line of conveyor 12 at an elevation higher than sprocket 30. The result of this arrangement is that the conveyor 12 is inclined upwardly with respect to conveyor 10 and vertical distances between given points on the two conveyors increase as their motion progresses.

Conveyor 21 travels at substantially the same speed as conveyor 10. It travels through a first zone 12a to one side of conveyor 10 then over wheel 30 and then through a second zone 12b above conveyor 10. Conveyor 12 has attached thereto at spaced intervals equal to the intervals between the molds 14, a plurality of clamping devices 34. These clamping devices 34 comprise a base bar 36 having a tapered leading end 37. Bar 36 is fastened by suitable clip means 38 to a link 40 in the conveyor 12. Secured to base bar 36 is the U-shaped yoke 42. Yoke 42 has a pin 44 extending between the legs thereof, and pin 44 carries an L-shaped member 46 in pivoted relation. Member 46 includes the outer leg 48 and the inner leg 50, the former of which has mounted at its end an upwardly extending operator 52. A coil spring 54 is disposed axially of pin 44 and terminates in downwardly extending portions 56 and 58 which extend into holes on the upper surfaces of arm 48 and base bar 36 respectively. Thus a clamp is formed having leg 50 and base bar 36 as the jaws. The spring 54 serves to bias the clamp in the closed disposition.

Figure 2:
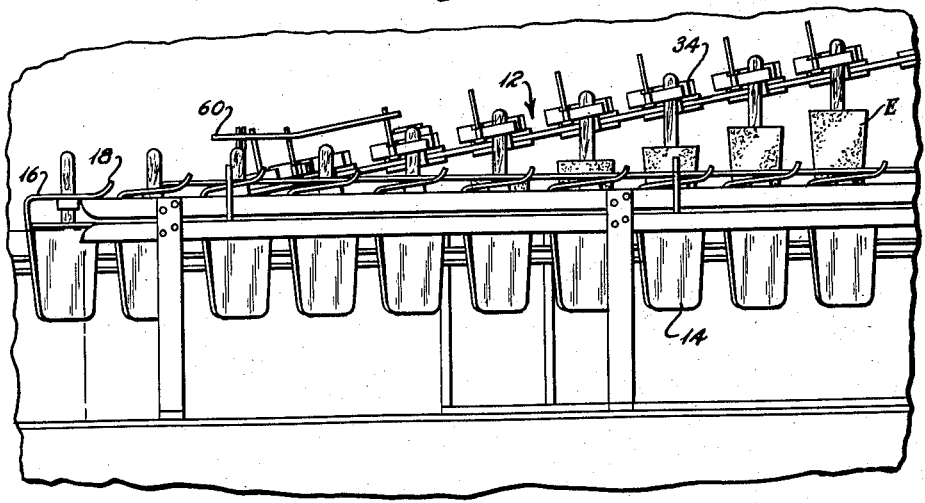
Fig. 2 is an enlarged elevational view of the withdrawing apparatus in operation.
Figure 6:
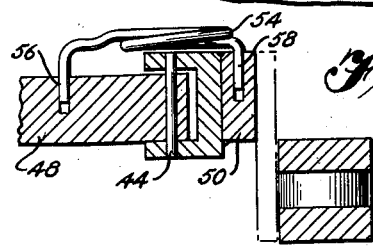
Fig. 6 is an enlarged sectional view taken on the line 6—6 of Fig. 4.

Means for opening the clamps 34 in the vicinity of sprocket 30 is shown in Fig. 1 and comprises a curved cam rod 60 which is disposed adjacent the sprocket 30. Rod 60 is stationary and is disposed to engage the operators 52 as the clamps 34 move successively into the operating area. The working surface of cam rod 60 is disposed closer to the path of travel of the base bars 36 than the length of the arms 48. Hence, the operators 52 on the ends of the arms 48 engage the rod 60 and are pressed rearwardly to open the jaws of the clamps. The configuration of the working surface of the rod 60 keeps the clamps open until a stick in one of the edibles carried by conveyor 10 is disposed between the jaws. At this point the operator 52 has progressed to the end of the working surface of rod 60 and the jaws biased by spring 54 close on the stick. As shown in Fig. 2, the clamps then travel upwardly with respect to the molds and the edibles E are withdrawn from the molds.

Subsequently, the confections are dipped in a suitable coating liquid, for instance, chocolate. This coating is allowed to harden on the confection during the travel of the conveyor. Finally the clamps carrying the confection again reach the area of the sprocket 30 where the operators 54 engage the rod 60 to open the clamps allowing the product to fall against deflector plate 70 and down through the aperture 72 (see Fig. 3).

The operation of my invention is now apparent. Its advantages include means for effecting the withdrawal of a frozen confection from its mold without interrupting the progress of the mold conveyor which carries the molds through the zone in which they are frozen. This advantage is clearly of benefit since it obviates the necessity for special conveyor drive means to supply the intermittent motion. In addition, wear on the parts of the apparatus due to the chocks of starting and stopping the mechanism is precluded. My invention is also advantageous in that it removes the frozen confections gradually from their molds and reduces the possibility of a stick pulling out of the confection itself. Another obvious advantage of the present invention is that it is extremely simple and requires little or no supervision. Its operation is automatic and its mechanism is so uncomplicated that it rarely requires service.

While this invention has been shown in but one form, it is obvious to those skilled in the art that it is not so limited but is susceptible of various changes and modifications without departing from the spirit and scope of the claimed invention.

I claim:

1. A confection making machine including a first endless conveyor carrying a plurality of molds, said molds adapted to contain an edible substance with a stick extending upwardly therefrom and a second endless conveyor carrying a plurality of clamps, said clamps each comprising a fixed jaw secured to said second conveyor and a pivoted jaw pivoted to said fixed jaw, said pivoted jaw having an operator bar, said clamp including biasing means biasing said clamp in a closed attitude, said first conveyor operating adjacent said second conveyor at at least one point, said conveyors diverging beyond said point, means at said point to allow said clamps to close on such sticks whereby as said conveyors diverge beyond said point said clamps withdraw such confections from their molds by such sticks, means to open said clamps after such confections are withdrawn from said molds to release said confections, the means to open said clamps and the means which allows said clamps to close being a stationary cam bar positioned in the vicinity of said point and adapted to be engaged by said operator bars.

2. A confection making machine as described in claim 1 wherein the end of said fixed jaw toward the direction in which the conveyor advances is tapered.

3. A confection making machine including a first endless conveyor carrying a plurality of molds, said molds adapted to contain an edible substance with a stick extending upwardly therefrom; said molds each carrying pivotable members adapted to support such sticks during a portion of the travel on the first conveyor, a second endless conveyor carrying a plurality of clamps, said first conveyor operating adjacent said second conveyor at at least one point, said conveyors diverging beyond said point, means at said point to allow said clamps to close on such sticks whereby as said conveyors diverge beyond said point said clamps withdraw such confections from their molds by such sticks; and means to open said clamps after such confections are withdrawn from said molds to release said confections.

4. A confection making machine as described in claim 3 wherein said pivotable members have upstanding portions and said upstanding portions are acted on by means to move aside said pivotable members prior to withdrawal of said confections to allow withdrawal.

5. A confection making machine as described in claim 4 wherein said means to move aside said pivotable members comprise a stationary cam surface.

References Cited in the file of this patent

UNITED STATES PATENTS

| | | |
|---|---|---|
| 1,960,456 | Robb | May 29, 1934 |
| 2,625,120 | Eddy | Jan. 13, 1953 |